United States Patent [19]
Smrek

[11] Patent Number: 5,579,011
[45] Date of Patent: Nov. 26, 1996

[54] SIMULTANEOUS TRIPLE APERTURE RADAR

[75] Inventor: Walter J. Smrek, Lake Ronkonkoma, N.Y.

[73] Assignee: Grumman Aerospace Corporation, Los Angeles, Calif.

[21] Appl. No.: 436,747

[22] Filed: Sep. 30, 1982

Related U.S. Application Data

[63] Continuation-in-part of Ser. No. 263,924, May 15, 1981, abandoned, which is a continuation of Ser. No. 90,570, Nov. 2, 1979, abandoned.

[51] Int. Cl.$^6$ .................................................. G01S 13/58
[52] U.S. Cl. ............................................. 342/113; 342/156
[58] Field of Search ........................... 343/7.7, 5 CM, 343/17.7; 342/113, 156

[56] References Cited

U.S. PATENT DOCUMENTS

| | | | |
|---|---|---|---|
| 3,735,399 | 5/1973 | Sletten et al. | 343/5 CM |
| 4,086,590 | 4/1978 | Goggins, Jr. | 343/5 CM |

Primary Examiner—Theodore M. Blum
Attorney, Agent, or Firm—Terry J. Anderson; Karl J. Hoch, Jr.

[57] ABSTRACT

An improved radar system and technique are disclosed for use in detecting and tracking moving or stationary targets within the antenna field of view. Precise correction of doppler induced location errors is provided by the use of raw sensor data. Return signals are doppler processed, phase shifted and compared in a manner which preserves the angle of arrival of a moving target irrespective of the boresight direction. Stationary target return signals are constructively combined so as to augment the target signal gain independent of the antenna boresight direction.

23 Claims, 3 Drawing Sheets

SIMULTANEOUS TRIPLE APERTURE RADAR

BACKGROUND OF THE INVENTION

This application is a continuation-in-part of copending application Ser. No. 263,924, filed May 15, 1981, now abandoned, which in turn is a continuation of application Ser. No. 090,570, filed Nov. 2, 1979, now abandoned.

The present invention relates to radar controlled weapons systems and, more particularly, to a method and apparatus for accurately positioning a moving or stationary target on a radar display as to precisely guide air-to-ground ordnance to a target.

With particular reference to moving target detection, it is well known that the reflected radar signal from a moving ground target may exhibit a doppler frequency appreciably different from that of ground scatterers in its immediate vicinity due to the additional doppler frequency shift caused by the component of target velocity along the antenna boresight direction. Since a synthetic aperture radar display maps each scatterer with an intensity proportional to its signal strength in a range versus azimuth angle coordinate frame, wherein azimuth angle is scaled according to the doppler frequency, a moving target having an additional doppler frequency component due to the target radial motion may be incorrectly located in azimuth on the radar display. If the resulting doppler shift is sufficiently great, e.g., beyond the frequency range of the ground clutter being mapped, the target could fall off the display entirely.

In conventional two-port interferometric radar systems, moving target information is doppler displaced and will typically overlay on a clutter patch. Depending upon the magnitude of the angular offset of the moving target and the strength of the clutter, the resulting azimuth error, using conventional two-port interferometer or sum and difference angle measurement techniques for relocating the moving target in azimuth on the display, can be of the order of one or two milliradians. Since one milliradian displacement is the equivalent of a one foot error per one thousand feet, this error becomes increasingly significant at the ranges typically intended for airborne radar systems. At a stand-off range of ten nautical miles, it can be shown that the resultant mislocation would be approximately sixty feet, clearly inadequate in terms of ordnance delivery.

One approach to providing precise doppler correction in the three antenna two channel system is described in the commonly assigned copending U.S. patent application Ser. No. 373,806, filed Apr. 30, 1982, entitled "Moving Target Ordnance Control", which is a continuation-in-part of application Ser. No. 272,048, filed Jun. 9, 1981, now abandoned, which in turn is a continuation of application Ser. No. 010,003, filed Feb. 7, 1979, now abandoned. The technique proposed therein is based upon sampling the reflected radar signal at each of three antenna ports as each traverses a single line of sight. The time sequenced signals received at a common location are then processed to accurately determine the radial velocity of the target with respect to the boresight direction. Accurate velocity gradient versus interferometer angle gradient information is then used to reposition the referenced target location as to eliminate the doppler induced error.

The present invention is intended to provide an alternative target detection system wherein multiple sampling from a common point is unnecessary.

The three port antenna system of the present invention has been found to produce accuracy approximately an order of magnitude greater than that of conventional two-port systems. Consequently, at a stand-off distance of ten nautical miles, the expected mislocation would be approximately six feet, a dramatic improvement.

Previous attempts at three-port radar processing systems have met with limited success due primarily to the signal combining techniques used to derive moving target information from the return energy signals. For example, U.S. Pat. No. 3,735,400 discloses a three channel interferometric synthetic aperture radar system designed for detecting moving targets wherein the doppler processed signals from the outside antennas (left and right) are phase shifted so that ground clutter in these channels is in phase with the center antenna signal. Each of these signals is then subtracted from the delayed and doppler processed center antenna signal to create two different signals which contain moving targets. A major problem with the disclosed system relates to its inability to relocate a moving target accurately. The technique employed for extracting moving target information has resulted in a corruption of the system's capability for interferometric angle measurement. In apparent recognition of this problem, the patentee simultaneously filed and brought to issue U.S. Pat. No. 3,735,399. This second patent represents an attempt to overcome the azimuth errors inherent in the first system by second order methodology using range rate derivatives. By knowing the movement of the aircraft and the target range from aperture-to-aperture, the moving target can be more accurately relocated on the display.

The applicant herein has recognized the problems presented in the previously proposed type of system and has disclosed herein a technique for accurately relocating moving targets through the use of the raw sensor data, without resort to range rate derivatives which rely on measurements of aircraft and target movements from aperture-to-aperture.

It is accordingly a general object of the present invention to provide an airborne synthetic aperture radar system which is not accompanied by the limitations and drawbacks associated with the known systems.

It is a particular object of the present invention to provide a method and apparatus for detecting and tracking moving and stationary objects within the antenna field of view.

It is another object of the present invention to provide a system for relocating moving targets on a display (or memory) as to ameliorate the effects of doppler induced location error.

It is a still further object of the present invention to provide a triple synthetic aperture radar system capable of generating high accuracy moving and stationary target information independent of the boresight direction.

SUMMARY OF THE INVENTION

The foregoing and other objects and advantages which will be apparent in the following detailed description of the preferred embodiment, or in the practice of the invention, are achieved by the invention disclosed herein, which generally may be characterized as a triple synthetic aperture radar system. The triple synthetic aperture radar system is operatively connected to simultaneously receive signals at each of the three antenna apertures. Signals so received are phase shifted to compensate for their physical spacing and compared to produce difference signals representative of a target's characteristic motion and location.

Signals received at the first aperture are phase shifted to effect anticipated clutter coincidence with the second channel, and signals received at the second channel are also phase shifted to effect anticipated clutter coincidence with the third channel. This technique allows two difference signals to be generated which accurately preserve the azimuth angle of the moving target irrespective of the boresight direction.

In the case of stationary targets, summation of signals after phase shifting the returns serves to reinforce the received signal as to effect increased stationary target signal gain independent of the antenna boresight direction.

Phase and amplitude imbalances between receiver channels are measured by averaging the difference signals over the field of view during one aperture. The data so obtained are used to generate phase and amplitude corrections which reduce error due to such imbalances in subsequent apertures.

The invention can be adapted for use with conventional two channel receivers by utilizing multiplexing means for sampling the received signal at alternating pairs of apertures. By alternating and time synchronizing the selected apertures, time coincidence may be simulated to effect triple aperture signal comparison. Moving and stationary objects may thereafter be detected and measured as described.

BRIEF DESCRIPTION OF THE DRAWINGS

Serving to illustrate an exemplary embodiment of the invention are the drawings of which.

DETAILED DESCRIPTION OF THE PREFERRED EMBODIMENT

In a typical scenario for air-to-ground weaponry, a missile or glide bomb is maneuvered to the start of a near-vertical terminal trajectory by inertial or radio location mid-course guidance techniques. In the terminal guidance phase, an interferometer antenna system is used in conjunction with a synthetic aperture radar and signal processor to perform measurements of the relative range and azimuth angle between the weapon and a ground target designated by the operator on a high resolution real-time synthetic aperture ground map display.

Figure 1:
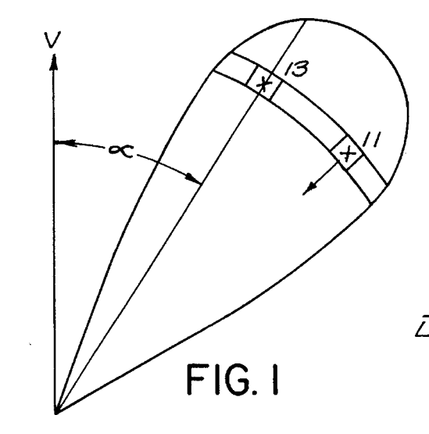
FIG. 1 is an illustration of a moving target mislocation problem addressed by the present invention.

As a weapon system closes on a target area, accurate target location information is needed in order to allow precise ordnance delivery. FIG. 1 illustrates the effect of target motion upon the observed target location on a radar display. As shown therein, a target at actual location 11, moving with some radial velocity along the antenna line of sight, introduces an additional doppler frequency component into the received radar signal due to its motion, so as to appear at location 13, at a displayed azimuth angle $\alpha$ with respect to the radar platform velocity V, where its return signal will be added to that of ground clutter at that location.

It has been noted that the received signal from a ground target that is moving may have a doppler frequency appreciably different from that of ground scatterers in its immediate vicinity due to the additional doppler frequency shift caused by the component of target velocity along the line of sight to the aircraft. Since the synthetic aperture radar display maps each scatterer with an intensity proportional to its signal strength in a range versus azimuth angle coordinate frame, wherein azimuth angle is scaled according to doppler frequency, a moving target may be incorrectly located in azimuth on the display, and, if its doppler shift is sufficiently great; e.g., beyond the frequency range of ground clutter being mapped, could move off the display entirely. In order for weapon guidance to be performed to such a moving target, it is essential to properly relocate it at position 11 on the display so that it could be viewed in the context of its surroundings. This initially requires that its range and antenna sensed azimuth angle be determined.

Conventional techniques, however, are still subject to substantial errors in display location as well as azimuth angle measurement required for weapon guidance. When the moving target's net doppler frequency falls within the main beam clutter frequency spectrum, the doppler filter containing the moving target signal also contains signal from stationary clutter from a totally different azimuth angle within the main beam. It is the presence of this clutter signal in the target doppler filter that produces serious errors in moving target azimuth angle measurement. It can further be seen that errors in antenna sensed azimuth angle measurement will produce corresponding errors in display relocation.

Figure 2A:
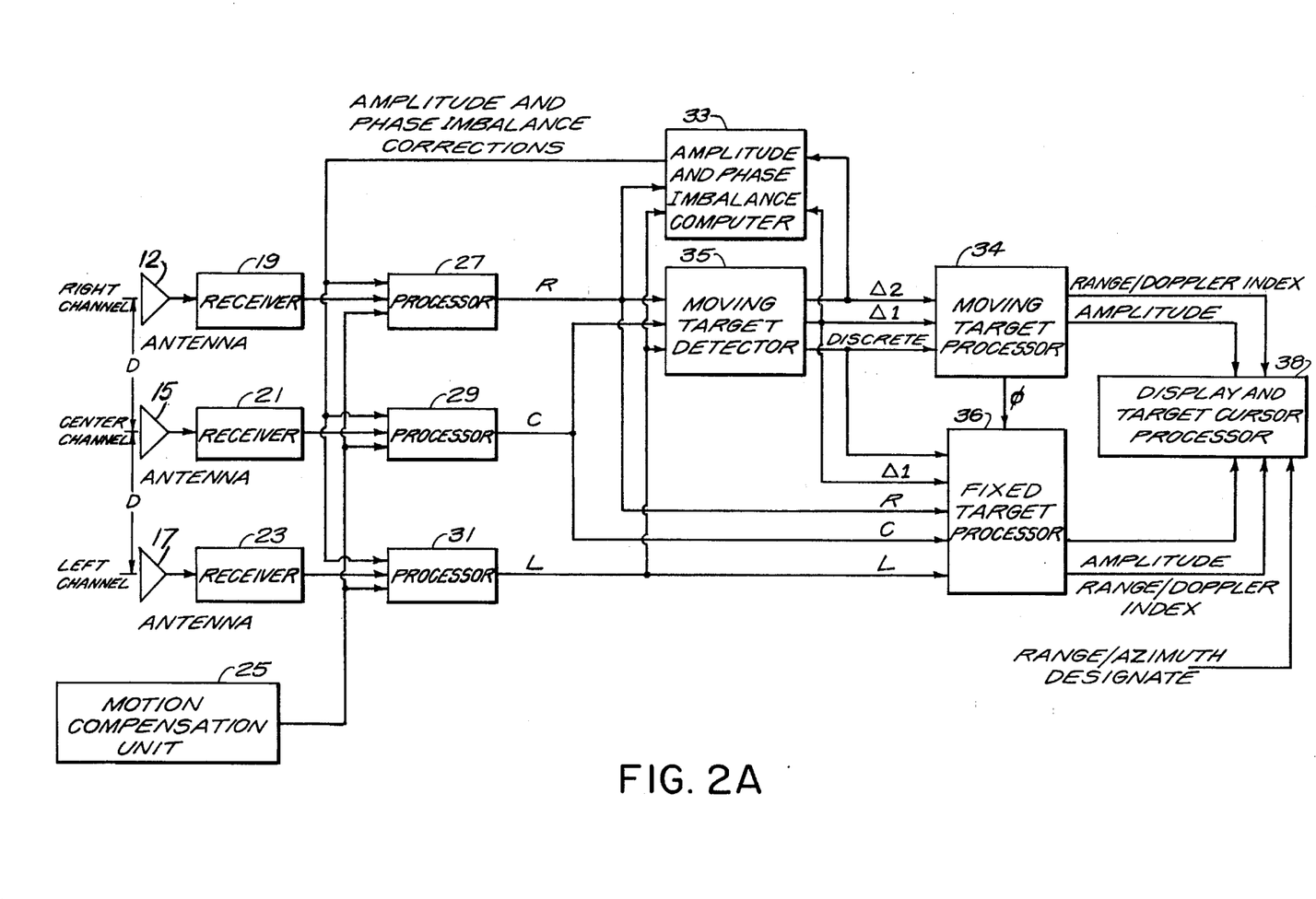
FIG. 2A is a block diagram representative of the simultaneous triple synthetic aperture radar system of the present invention.

FIG. 2A illustrates an exemplary embodiment of the present invention including three aircraft mounted antenna ports (12, 15 and 17) whose respective phase centers are displaced from one another in the horizontal plane by a distance D. The antenna ports may be three physically separate antenna assemblies, or they may be component parts of a single array or other integral antenna assembly. The linearly spaced antenna ports may lie along a line making any arbitrary angle with respect to the aircraft's velocity vector. Transmission may be from a single array or other integral antenna assembly.

Figure 3:
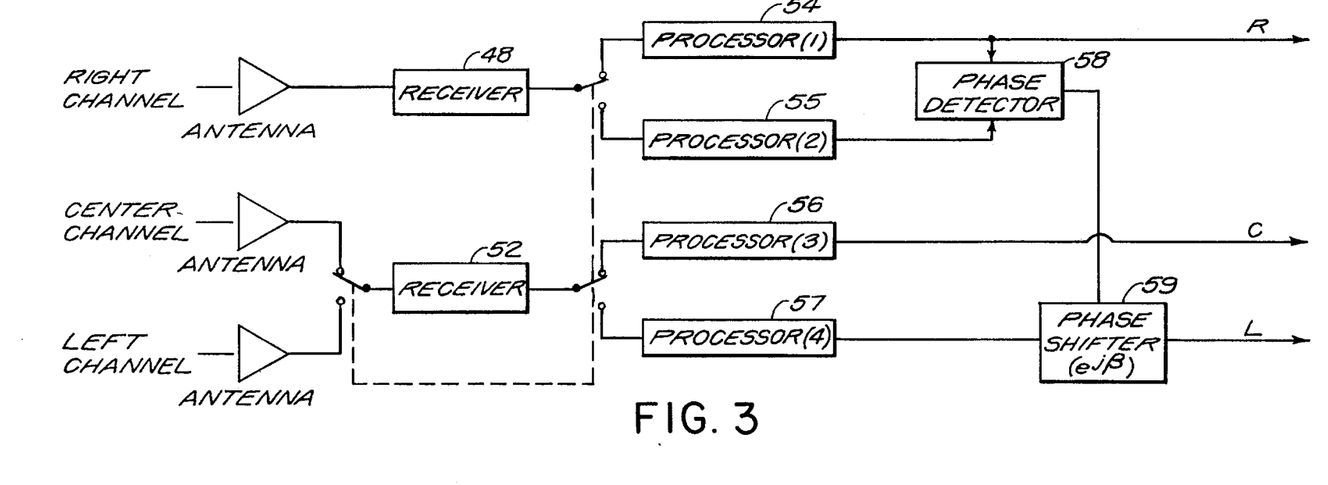
FIG. 3 is a block diagram of a multiplexed two channel version of the present invention.

The receivers 19, 21 and 23 can be three separate receivers as shown in FIG. 2A, or a lesser number using time or frequency multiplexing techniques as illustrated in FIG. 3. Each receiver is a linear amplifier whose gain is not a function of signal strength.

Compensation for radar platform motion is performed prior to doppler filtering by motion compensation unit 25. Techniques used to effect this compensation are described in the aforementioned copending application Ser. No. 373,806, the disclosure of which is incorporated herein by reference.

Synthetic Array Processors 27, 29 and 31 may also be either separate processors or integral portions of a single processing device. Commercially available processing systems such as the Vector Array Processor, Model AP 120B, manufactured by Floating Point Systems, or an equivalent, may be readily adapted to perform the continuous processing functions of the present invention.

Processors 27, 29 and 31 output processed signals from the right (R), center (C) and left (L) channels respectively into moving target detector 35 and fixed target processor 36. Signals R, C and L represent received signals which have been amplified, filtered and doppler processed into more useful forms by the redundant receiver and synthetic array processor combinations.

Moving target detector 35 outputs two clutter cancellation residuals $\Delta 1$ and $\Delta 2$ and a moving target detection discrete when a moving target is detected in the range/doppler cell being processed. When there is no moving target in that cell, only the detection discrete so indicating is put out by detector 35. The means and method of moving target detection are illustrated in detail in FIG. 2B.

Moving target processor 34 determines target position and return amplitude. The means and method of moving target processing are illustrated in detail in FIG. 2C, where the phase angle between the two residuals $\Delta 1$ and $\Delta 2$ is measured and related to the target's position. The target signal magnitude is derived from one of the residuals, in this case $\Delta 1$.

For a particular range and doppler frequency cell such as is illustrated in 13 of FIG. 1, signals R, C and L, derived from simultaneously sampled receptions at antenna ports 12, 15 and 17 can be represented as:

$$R = Me^{j\phi_o} + Se^{j\theta_o}$$

$$C = Me^{j(\phi_o + \phi)} + Se^{j(\theta_o + \theta)}$$

$$L = Me^{j(\phi_o + 2\phi)} + Se^{j(\theta_o + 2\theta)}$$

where:

M is the amplitude of the moving target signal in the doppler filter/range cell;

$\phi_o$ is the phase angle of the moving target signal in the right channel;

$\phi$ is the moving target signal's phase shift from right to center channel and center to left channel due to the moving target signal's interferometric angle of arrival;

S is the clutter (or fixed target) signal amplitude;

$\theta_o$ is the phase angle of the clutter signal in the right channel; and $\theta$ is the phase shift from right to center channels and center to left channel due to the clutter signals' interferometric angle of arrival.

By performing Fast Fourier Transforms within the synthetic array processors on a quantity of N pulses of received radar signals at wavelength ($\lambda$) and at a given Pulse Repetition Interval (PRI), we obtain a doppler filter separation, between filters, of df, where $$df = \frac{1}{(N \cdot PRI)}.$$

Using n to indicate a filter number relative to the zero frequency (frequency at antenna boresight/motion compensation point), n can be expressed as $$n = \frac{df_d}{df} = (N \cdot PRI) \cdot \frac{(2 \cdot Vg \cdot \sin \psi \, d\psi)}{\lambda}$$

where Vg is the radar velocity relative to the ground and $\psi$ is the angle from the velocity vector to the SAR motion compensation point.

In addition, the PRI of the transmitted radar pulse can be controlled such that:

$$PRI = \frac{k \cdot D}{2 \cdot Vg \cdot \sin \psi}$$

where D is the antenna spacing and k is some constant multiplier.

Substituting the two previous equations yields:

$$n = N \cdot \frac{D \cdot k}{2 \cdot Vg \cdot \sin \psi} \cdot \frac{2 \cdot Vg \cdot \sin \psi \, d\psi}{\lambda}$$

$$= \frac{N \cdot D \cdot K}{\lambda} d\psi.$$

$\theta e$ is defined as the expected interferometric phase shift between channels due to "fixed" targets (ground return) at each doppler frequency being processed. This is nominally the expected interferometric phase difference between antennas for ground returns, which for a small $d\psi$ and using the above defined relationships can be given as $$\theta e = \frac{2\pi D}{\lambda} \sin d\psi \approx \frac{2\pi D}{\lambda} d\psi = \frac{2\pi D}{\lambda} \cdot \frac{n \lambda}{N \cdot D \cdot K} = \frac{2\pi n}{N \cdot K}.$$

Figure 2B:
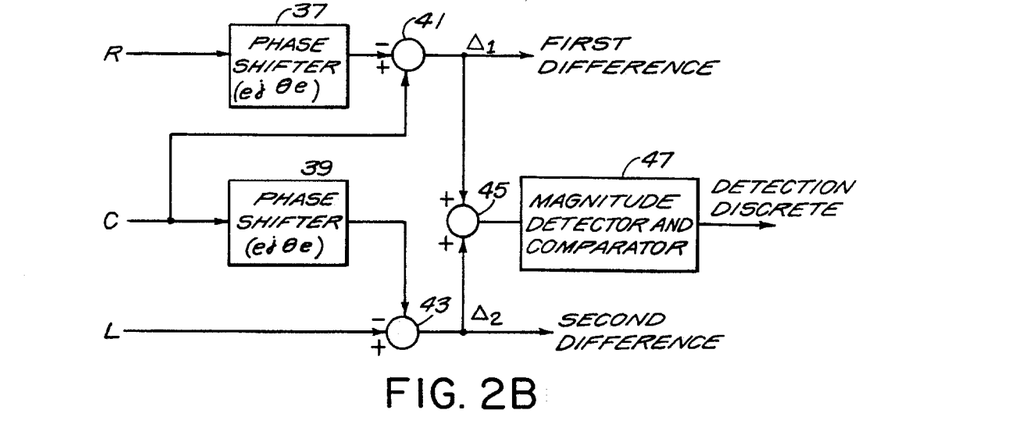
FIG. 2B is a block diagram illustrating in detail the moving target detector of FIG. 2A.

Referring to FIG. 2B, the R and C signals are first phase shifted by electrical phase angle $\theta e$ derived above. These phase rotations are performed by phase shifters 37 and 39. Then, clutter cancellation between adjacent channels is effected by subtracting the phase shifted signals R and C from the original signals C and L, respectively. Adders 41 and 43 perform these subtractions. The difference signals $\Delta 1$ and $\Delta 2$ thus created may be represented mathematically as:

$$\Delta 1 = C - Re^{j\theta e}$$

$$\Delta 2 = L - Ce^{j\theta e}.$$

The difference signals $\Delta 1$ and $\Delta 2$ are combined to form a moving target return signal. The differences $\Delta 1$ and $\Delta 2$ are first added in adder 45 to reduce the effect of noise. Magnitude detector and comparator 47 compares the magnitude of the combined $\Delta 1$ and $\Delta 2$ to a detection threshold. Sufficiently large differences indicate the presence of a moving target in the cell under consideration, in which case a moving target detection discrete triggers further moving target processing by processor 34 in FIG. 2A and clutter processing by 26 in FIG. 2D. Differences below threshold trigger fixed target processing starting with phase shifters 28 and 32 in FIG. 2D.

By expanding the previous equations and assuming $\theta e$ is approximately equal to $\theta$, the difference signals can be represented as:

$$\Delta 1 = Me^{j\phi_o}(e^{j\phi} - e^{j\theta e})$$

$$\Delta 2 = Me^{j\phi_o}e^{j\phi}(e^{j\phi} - e^{j\theta e})$$

which can be expressed as:

$$\Delta 2 = \Delta 1 \cdot e^{j\phi}.$$

Figure 2C:
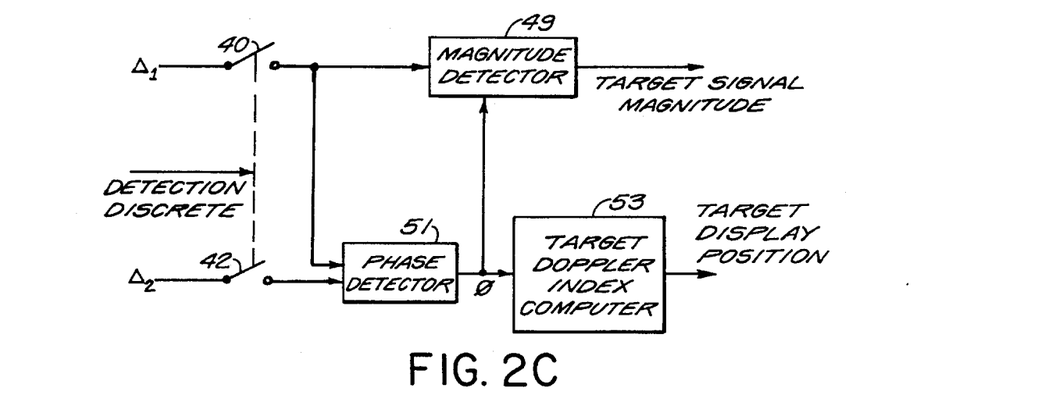
FIG. 2C is a block diagram illustrating in detail the moving target processor of FIG. 2A.

Referring to FIG. 2C, switches 40 and 42 are closed when a target is detected, and phase detector 51 operates to compare difference signals and thereby identify the angle $\phi$ between $\Delta 1$ and $\Delta 2$, which represents the phase shift due to the moving target's angle of arrival, as previously described.

The moving target can, therefore, be distinguished from the clutter frequency spectrum and relocated in its proper azimuth location.

By phase detecting the signals of $\Delta 1$ and $\Delta 2$, one obtains and by substituting $\phi$ in:.

$$n = \frac{\phi}{2\pi} \, kN$$

and solving for n, one can determine the true doppler filter number of the moving target corresponding to its actual azimuth position. This is performed in target doppler index computer 53. Computer 53 can also derive the angle off boresight $\delta\psi$ of the moving target by solving $$\sin \delta\psi = \frac{\lambda n}{N \cdot K \cdot D} \ .$$

Once the electrical phase angle $\phi$ is determined, the signal strength of the moving target can be calculated by taking the magnitude of $$Me^{j\theta_o} = \frac{\Delta 1}{(e^{j\phi} - e^{j\phi_e})}$$

This is performed by magnitude detector 49.

The computing elements in FIGS. 2B and 2C may form an integral portion of the synthetic array processor or may be externally connected. Any of a number of general purpose digital signal processors are suitable for these functions.

The present technique allows for concurrent refinement of the displayed target location by providing means for correcting phase or amplitude imbalances between the antenna and receive channel combinations.

Each antenna port should preferably have identical signal response patterns and be uniformly spaced for mathematical convenience. As one skilled in the art will recognize, the preference for matched signal patterns can be eased by using the residual signals ($\Delta 1$ and $\Delta 2$) to recognize irregularities in each pattern and compensating for these irregularities.

Variations in the response of each antenna port/receiver channel combination can also be determined by comparing the phase rotated received pulses with the pulses received in the adjacent port. If phase or amplitude differences between the two representative signals are measured over a period of time, a performance error can be computed and used to correct further incoming signals.

One reference to a system for compensating for uncalibrated and time varying parameters is provided in U.S. Pat. No. 3,993,994, "Adaptive Clutter Cancellation for Synthetic Aperture AMTI Radar", assigned to the United States of America as represented by the Secretary of the Air Force. An alternate method better adapted to the present system is as follows.

Since a relatively small number of range/doppler cells in the SAR aperture will contain moving targets, for the large majority of cells, differences $\Delta 1$ and $\Delta 2$, if any, may be considered as due to phase and amplitude imbalances between channels. An estimate of these imbalances can be obtained by averaging the quantities $\Delta 1/R$ and $\Delta 2/L$ over all range/doppler cells. The imaginary and real parts of the first average quantity will represent the phase imbalance and amplitude imbalance, respectively, between the right and center receiver channels. Similarly, the imbalances between the left and center receiver channels will be given by the imaginary and real parts of the second average quantity. These imbalance corrections can be applied to the raw signals before processing at 27, 29 and 31 during the next SAR aperture.

Phase and amplitude balancing control may be effected by means of amplitude and phase imbalance computer 33. Commercially available units such as the AP 120B, previously described, or the Model PDP11-34M, manufactured by Norden/DEC are both suitable for performing these functions.

One advantage of the present invention is that precise control of the pulse repetition frequency is not a requirement, as it would be for Arrested Synthetic Aperture Radar (SAR), Displaced Phase Center Antenna (DPCA) or other techniques which form consecutive apertures at a single point in space. Simultaneous sampling allows the PRF to vary at any frequency since each channel receives the same signal, regardless of the signals absolute frequency. Any variation of the PRF would, therefore, effect each channel similarly.

Since the spacial relationships between the antenna ports is known, the expected phase difference between antennas can be determined and anticipated phase coincidence between adjacent channels can be effected.

Prior triple aperture techniques have been deficient in that there has been proposed no system, using the raw radar signal, which is capable of accurate moving and stationary target tracking along any boresight direction.

By phase rotating each doppler processed received signal according to the present invention, intrinsic angular information is preserved and measured for accurate target location.

Figure 4:
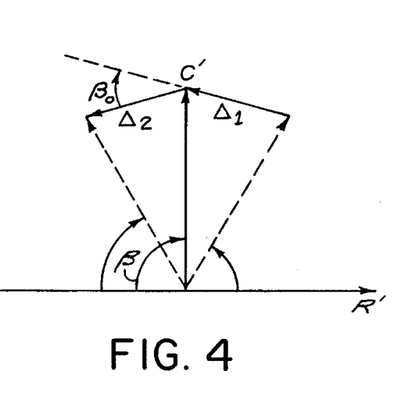
FIG. 4 is a vector diagram illustrating conventional phase shifting techniques.
Figure 5:
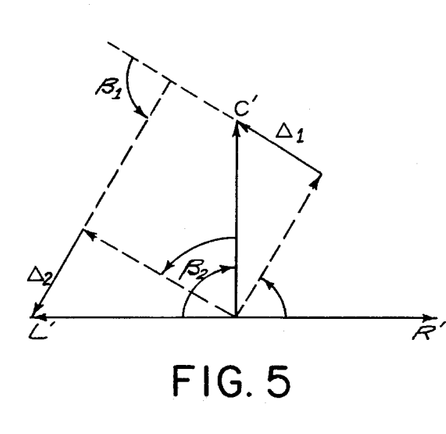
FIG. 5 is a vector diagram illustrating the phase shifting technique of the present invention.

FIGS. 4 and 5 illustrate conventional and proposed phase rotating techniques, respectively, demonstrating the angular information derivable from each. In FIGS. 4 and 5, three received signals, L', R' and C' representing the moving target's contribution to resultant phasors R, C and L, are shown having equal signal magnitude and 90° phase difference. By rotating the right and left signals to anticipated clutter coincidence with the center signal, as in FIG. 4, two difference signals, $\Delta 1$ and $\Delta 2$ can be generated. The angle between $\Delta 1$ and $\Delta 2$ is defined as $\beta_o$.

FIG. 5 by comparison shows a technique for phase shifting the right signal only into expected clutter coincidence with the center signal. The center signal is phase shifted into expected clutter coincidence with the left signal. The angle between the two difference signals is labeled $\beta_1$.

In FIG. 5, it can be seen that $\beta_1$ is the same angle as that between L and C ($\beta$). This relationship holds true regardless of the boresight direction or the target motion. In FIG. 4, the angle $\beta_o$ is not the same angle as that between R and C ($\beta$). Although for some geometries, $\beta$ may be the same angle as that between adjacent channel signals, it would be mere coincidence.

This mechanization difference provides the present invention the capability to perform interferometric phase angle (and hence angle of arrival) measurement on the moving target without requiring target range rate information and other navigational signals. The inventor herein has recognized the cause of corruption of angular information in conventional systems and conceived the proposed system overcoming these problems.

Figure 2D:
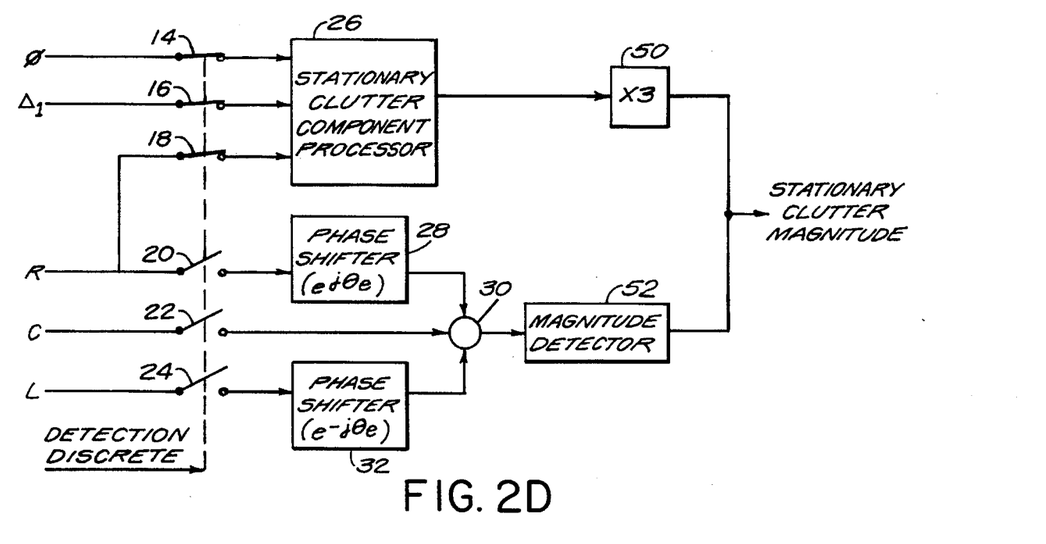
FIG. 2D is a block diagram illustrating in detail the fixed target processor of FIG. 2A.

When a moving target is found, switches 14, 16 and 18 of FIG. 2D are closed, and fixed target (or clutter) processing consists in solving the equations representing phasors R, C and L to obtain the clutter signal component S. This is done in stationary clutter component processor 26 of FIG. 2D by calculating the absolute magnitude of either $$Se^{j\theta_o} = R - \frac{\Delta 1}{(e^{j\phi} - e^{j\theta})} \text{ or } Se^{j(\theta_o + \theta)} = C - \frac{\Delta 2}{(e^{j\phi} - e^{j\theta})} \ .$$

The moving target's signal magnitude M having been determined and relocated in doppler filter n, i.e., into position 11 of FIG. 1, stationary signal magnitude S is now placed into position 13, i.e., in the doppler filter being processed.

In the absence of a moving target, switches 20, 22 and 24 are closed and the simultaneous input signals R and L are phase rotated by phase shifters 28 and 32 to anticipated vector coincidence with C and then added to C by adder 30 so that the signals vectorially reinforce each other. By effecting phase coincidence before signal summing, the present invention allows high gain mapping independent of the target's angle relative to boresight. The final product will be a signal having approximately triple the strength of the received impulse on any particular antenna/receiver channel without requiring any increase in operating power. For this reason, the output of processor 26 in FIG. 2D is multiplied by three in multiplier 50 to balance display magnitudes of all doppler filters. The outputs of processor 36 may then be displayed in Display and Target Cursor Processor 38 in FIG. 2A.

The moving target's signal magnitude and doppler index and the stationary clutter signal magnitude and doppler index are communicated to the display and target cursor processor 38 which generates a radar range versus doppler display.

FIG. 3 depicts an exemplary time multiplexing scheme for mechanizing the system with only two receivers. The multiplexing technique permits the invention to be compatible with many receiver systems currently in aircraft use. Various switching and phase rotating sequences can be used as long as the resulting angle between difference signals indicates the received signal angle of arrival.

On the first and subsequent odd number pulses of an aperture, the right and center channels are processed in synthetic array processors 54 and 56. On the second and subsequent even numbered pulses of an aperture, the right and left channels are processed in synthetic array processors 55 and 57. Phase detector 58 determines the phase shift β between odd and even pulses, as received in the right channel. Detector 58 outputs phase B by which the phase shifter 59 rotates the left channel signal to time (phase) synchronize the left channel signal with the right and center channel signals in processors 54 and 56.

In practice, processor 55 and phase detector 58 may not be required and may be replaced by a phase computer since the pulse-to-pulse phase difference can be estimated knowing the average PRF during the aperture and the frequency fd of the particular doppler filter being processed.

The electrical phase difference B between odd and even arrays is given by $$\beta = 2\pi f_d \frac{1}{PRF}.$$

Signals R, C and L obtained in FIG. 3 can then be further processed as shown in FIG. 2A.

Stationary target mapping is carried out in the same manner as with the three receiver system, further including the pulse-to-pulse time synchronization as just described.

While the invention has been described in one presently preferred embodiment, it is understood that the words which have been used are words of description rather than words of limitation and that changes within the purview of the appended claims may be made without departing from the scope and spirit of the invention in its broader aspects.

What is claimed is:

1. In conjunction with an airborne synthetic aperture radar system having at least a first, second and third receiving antenna element, a method for detecting a moving target comprising the steps of:

a) positioning said first, second and third receiving antenna elements in a spaced relationship;

b) compensating the radar return signals received during a given aperture by said spaced first, second and third antenna elements to account for the motion of the radar bearing aircraft;

c) processing the motion compensated received radar return signals to form a first, second and third doppler processed signal, respectively;

d) phase shifting said first doppler processed signal by a predetermined amount;

e) phase shifting said second doppler processed signal by a predetermined amount;

f) differencing said phase shifted first doppler processed signal and said second doppler processed signal to form a first difference signal;

g) differencing said phase shifted second doppler processed signal and said third doppler processed signal to form a second difference signal; and h) detecting using said first and second difference signals the presence or absence of a moving target.

2. In conjunction with an airborne synthetic aperture radar system having at least a first, second and third receiving antenna element, a method for detecting and tracking a moving target comprising the steps of:

a) positioning said first, second and third receiving antenna elements in a spaced relationship;

b) compensating the radar return signals received during a given aperture by said spaced first, second and third antenna elements to account for the motion of the radar bearing aircraft;

c) processing the motion compensated received radar return signals to form a first, second and third doppler processed signal, respectively;

d) phase shifting said first doppler processed signal by a predetermined amount;

e) phase shifting said second doppler processed signal by a predetermined amount;

f) differencing said phase shifted first doppler processed signal and said second doppler processed signal to form a first difference signal;

g) differencing said phase shifted second doppler processed signal and said third doppler processed signal to form a second difference signal;

h) detecting using said first and second difference signals the presence or absence of a moving target; and i) determining when the presence of a moving target is detected the interferometric phase angle between said first and second difference signals, said interferometric phase angle being representative of the azimuth angle of the detected moving target.

3. In conjunction with an airborne synthetic aperture radar system having at least a first, second and third receiving antenna element, and a display, a method for detecting, tracking and displaying a moving target comprising the steps of:

a) positioning said first, second and third receiving antenna elements in a spaced relationship;

b) compensating the radar return signals received during a given aperture by said spaced first, second and third antenna elements to account for the motion of the radar bearing aircraft;

c) processing the motion compensated received radar return signals to form a first, second and third doppler processed signal, respectively;

d) phase shifting said first doppler processed signal by a predetermined amount;

e) phase shifting said second doppler processed signal by a predetermined amount;

f) differencing said phase shifted first doppler processed signal and said second doppler processed signal to form a first difference signal;

g) differencing said phase shifted second doppler processed signal and said third doppler processed signal to form a second difference signal;

h) detecting using said first and second difference signals the presence or absence of a moving target;

i) determining when the presence of a moving target is detected the interferometric phase angle between said first and second difference signals, said interferometric phase angle being representative of the azimuth angle of the detected moving target; and j) positioning using said interferometric phase angle the detected moving target on said display.

4. In conjunction with an airborne synthetic aperture radar system having at least a first, second and third receiving antenna element, a method for detecting a moving target comprising the steps of:

a) positioning said first, second and third receiving antenna elements in a linear spaced relationship;

b) compensating the radar return signals received during a given aperture by said linearly spaced first, second and third antenna elements to account for the motion of the radar bearing aircraft;

c) processing the motion compensated received radar return signals to form a first, second and third doppler processed signal, respectively;

d) phase shifting said first doppler processed signal by a predetermined amount;

e) phase shifting said second doppler processed signal by a predetermined amount;

f) differencing said phase shifted first doppler processed signal and said second doppler processed signal to form a first difference signal;

g) differencing said phase shifted second doppler processed signal and said third doppler processed signal to form a second difference signal;

h) combining in a predefined manner said first and second difference signals to form a moving target return signal; and i) detecting by comparing the magnitude of said moving target return signal to a predetermined moving target detection threshold the presence or absence of a moving target.

5. In conjunction with an airborne synthetic aperture radar system having at least a first, second and third receiving antenna element, a method for detecting and tracking a moving target comprising the steps of:

a) positioning said first, second and third receiving antenna elements in a linear spaced relationship;

b) compensating the radar return signals received during a given aperture by said linearly spaced first, second and third antenna elements to account for the motion of the radar bearing aircraft;

c) processing the motion compensated received radar return signals to form a first, second and third doppler processed signal, respectively;

d) phase shifting said first doppler processed signal by a predetermined amount;

e) phase shifting said second doppler processed signal by a predetermined amount;

f) differencing said phase shifted first doppler processed signal and said second doppler processed signal to form a first difference signal;

g) differencing said phase shifted second doppler processed signal and said third doppler processed signal to form a second difference signal;

h) combining in a predefined manner said first and second difference signals to form a moving target return signal;

i) detecting by comparing the magnitude of said moving target return signal to a predetermined moving target detection threshold the presence or absence of a moving target; and j) determining when the presence of a moving target is detected the interferometric phase angle between said first and second difference signals, said interferometric phase angle being representative of the azimuth angle of the detected moving target.

6. In conjunction with an airborne synthetic aperture radar system having at least a first, second and third receiving antenna element, and a display, a method for detecting, tracking and displaying a moving target comprising the steps of:

a) positioning said first, second and third receiving antenna elements in a linear spaced relationship;

b) compensating the radar return signals received during a given aperture by said linearly spaced first, second and third antenna elements to account for the motion of the radar bearing aircraft;

c) processing the motion compensated received radar return signals to form a first, second and third doppler processed signal, respectively;

d) phase shifting said first doppler processed signal by a predetermined amount;

e) phase shifting said second doppler processed signal by a predetermined amount;

f) differencing said phase shifted first doppler processed signal and said second doppler processed signal to form a first difference signal;

g) differencing said phase shifted second doppler processed signal and said third doppler processed signal to form a second difference signal;

h) combining in a predefined manner said first and second difference signals to form a moving target return signal;

i) detecting by comparing the magnitude of said moving target return signal to a predetermined moving target detection threshold the presence or absence of a moving target;

j) determining when the presence of a moving target is detected the interferometric phase angle between said first and second difference signals, said interferometric phase angle being representative of the azimuth angle of the detected moving target;

k) determining using said interferometric phase angle the doppler filter index of the detected moving target;

l) determining using said interferometric phase angle and one of said first and second difference signals the signal strength of the detected moving target;

m) determining using said interferometric phase angle, one of said first and second difference signals, and one of said first, second and third doppler processed signals the signal strength of the stationary clutter underlying the detected moving target; and n) displaying using said signal strength and said doppler filter index of the detected moving target, and said signal strength and known doppler filter index of the stationary clutter the detected moving target on said display.

7. A method as recited in claim 6 further including when the absence of a moving target is detected the steps of:
   a) phase shifting said third doppler processed signal by a predetermined amount;
   b) summing said phase shifted first doppler processed signal said second doppler processed signal and said phase shifted third doppler processed signal to form an enhanced stationary clutter return signal; and
   c) displaying using the known doppler filter index of the stationary clutter and said enhanced stationary clutter return signal the stationary clutter on said display.

8. A method as recited in claim 6 further including the step of applying phase and amplitude corrections to the radar return signals received during a given aperture, the amount of said phase and amplitude corrections having been determined during the preceding aperture using said first and second difference signals, and said first and third doppler processed signals.

9. A method as recited in claim 8 wherein said signal strength of the detected moving target is determined using said interferometric phase angle and said first difference signal, and said signal strength of the stationary clutter underlying the detected moving target is determined using said interferometric phase angle, said first difference signal and said first doppler processed signal.

10. A method as recited in claim 8 wherein said signal strength of the detected moving target is determined using said interferometric phase angle and said first difference signal, and said signal strength of the stationary clutter underlying the detected moving target is determined using said interferometric phase angle, said second difference signal and said second doppler processed signal.

11. An airborne synthetic aperture radar system comprising:
   a) first, second and third receiving antenna means positioned in a spaced relationship;
   b) means for compensating the radar return signals received by said spaced first, second and third receiving antenna means to account for the motion of the radar bearing aircraft;
   c) means for processing the motion compensated received radar return signals to form a first, second and third doppler processed signal, respectively;
   d) means for phase shifting said first doppler processed signal by a predetermined amount;
   e) means for phase shifting said second doppler processed signal by a predetermined amount;
   f) means for differencing said phase shifted first doppler processed signal and said second doppler processed signal to form a first difference signal;
   g) means for differencing said phase shifted second doppler processed signal and said third doppler processed signal to form a second difference signal; and
   h) means for detecting using said first and second difference signals the presence or absence of a moving target.

12. An airborne synthetic aperture radar system as recited in claim 11 including means for determining when the presence of a moving target is detected the interferometric phase angle between said first and second difference signals, said interferometric phase angle being representative of the azimuth angle of the detected moving target.

13. An airborne synthetic aperture radar system as recited in claim 12 including means for positioning using said interferometric phase angle the detected moving target on a display.

14. An airborne synthetic aperture radar system comprising:
   a) first, second and third receiving antenna means positioned in a linear spaced relationship;
   b) means for compensating the radar return signals received by said linearly spaced first, second and third receiving antenna means to account for the motion of the radar bearing aircraft;
   c) receiving and doppler processing means operatively connected to said linearly spaced first, second and third receiving antenna means, and to said motion compensating means, said receiving and doppler processing means including means for forming a first, second and third doppler processed signal, respectively;
   d) moving target detecting means operatively connected to said receiving and doppler processing means, said moving target detecting means including:
      1) means for phase shifting said first doppler processed signal by a predetermined amount;
      2) means for phase shifting said second doppler processed signal by a predetermined amount;
      3) means for differencing said phase shifted first doppler processed signal and said second doppler processed signal to form a first difference signal;
      4) means for differencing said phase shifted second doppler processed signal and said third doppler processed signal to form a second difference signal; and
      5) means for detecting using said first and second difference signals the presence or absence of a moving target.

15. An airborne synthetic aperture radar system as recited in claim 14 including moving target processing means operatively connected to said moving target detecting means, said moving target processing means including means for determining when the presence of a moving target is detected the interferometric phase angle between said first and second difference signals, said interferometric phase angle being representative of the azimuth angle of the detected moving target.

16. An airborne synthetic aperture radar system as recited in claim 15 wherein said moving target processing means further includes means for determining the doppler filter index of the detected moving target, and means for determining the signal strength of the detected moving target.

17. An airborne synthetic aperture radar system as recited in claim 16 including:
   a) fixed target processing means operatively connected to said receiving and doppler processing means, said moving target detecting means and said moving target processing means, said fixed target processing means including means for determining the signal strength of the stationary clutter underlying the detected moving target; and
   b) display and target cursor processing means operatively connected to said moving target processing means and said fixed target processing means, said display and target cursor processing means including means for displaying the detected moving target and the underlying stationary clutter.

18. An airborne synthetic aperture radar system as recited in claim 17 wherein said fixed target processing means further includes means for enhancing when the absence of a moving target is detected the stationary clutter, said stationary clutter enhancing means including:
- a) means for phase shifting said third doppler processed signal by a predetermined amount; and
- b) means for summing said phase shifted first doppler processed signal, said second doppler processed signal and said phase shifted third doppler processed signal to form an enhanced stationary clutter return signal, said signal being utilized to enhance in the absence of a detected moving target the displayed stationary clutter.

19. An airborne synthetic aperture radar system as recited in claim 18 wherein said receiving and doppler processing means further include multiplexing means for sampling in alternating pairs the radar return signals received by said linearly spaced first, second and third receiving antenna means.

20. An airborne triple synthetic aperture radar system comprising:
- a) first, second and third receiving antenna means positioned in a linear spaced relationship;
- b) first, second and third receiving means operatively connected to and responsive to the radar return signals received by said linearly spaced first, second and third receiving antenna means, respectively.;
- c) means for compensating the received radar return signals to account for the motion of the radar bearing aircraft;
- d) first, second and third doppler processing means operatively connected and responsive to said first, second and third receiving means, respectively, and to said motion compensating means, said first, second and third doppler processing means including means for forming a first, second and third doppler processed signal, respectively;
- e) moving target detecting means operatively connected and responsive to said first, second and third doppler processing means, said moving target detecting means including:
  1) means for phase shifting said first doppler processed signal by a predetermined amount;
  2) means for phase shifting said second doppler processed signal by a predetermined amount;
  3) means for differencing said phase shifted first doppler processed signal and said second doppler processed signal to form a first difference signal;
  4) means for differencing said phase shifted second doppler processed signal and said third doppler processed signal to form a second difference signal;
  5) means for combining said first and second difference signals to form a moving target return signal; and
  6) means for comparing the magnitude of said moving target return signal to a predetermined moving target detection threshold to detect the presence or absence of a moving target;
- f) moving target processing means operatively connected and responsive to said moving target detecting means, said moving target processing means including:
  1) means operative when the presence of a moving target is detected for determining the interferometric phase angle between said first and second difference signals;
  2) means for determining using said interferometric phase angle the doppler filter index of the detected moving target; and
  3) means for determining using said interferometric phase angle and one of said first and second difference signals the signal strength of the detected moving target;
- g) fixed target processing means operatively connected and responsive to said first, second and third doppler processing means, said moving target detecting means, and said moving target processing means, said fixed target processing means including means for determining using said interferometric phase angle, one of said first and second difference signals, and one of said first, second and third doppler processed signals the signal strength of the stationary clutter underlying the detected moving target; and
- h) display and target cursor processing means operatively connected and responsive to said moving target processing means and said fixed target processing means, said display and target cursor processing means including means for displaying using said signal strength and said doppler filter index of the detected moving target, and said signal strength and known doppler filter index of the stationary clutter the detected moving target and the underlying stationary clutter.

21. An airborne triple synthetic aperture radar system as recited in claim 20 wherein said fixed target processing means further include means operative when the absence of a moving target is detected for enhancing the stationary clutter, said stationary clutter enhancing means including:
- a) means for phase shifting said third doppler processed signal by a predetermined amount; and
- b) means for summing said phase shifted first doppler processed signal, said second doppler processed signal and said phase shifted third doppler processed signal to form an enhanced stationary clutter return signal, said signal being utilized to enhance in the absence of a detected moving target the displayed stationary clutter.

22. An airborne triple synthetic aperture radar system as recited in claim 21 including means for applying phase and amplitude corrections to the received radar return signals.

23. An airborne triple synthetic aperture radar system as recited in claim 22 wherein the amount of said phase and amplitude corrections being determined during the preceding aperture using said first and second difference signals, and said first and third doppler processed signals.

* * * * *